2,964,416

METHODS OF MAKING A LIGNOCELLULOSE PRODUCT AND PRODUCTS RESULTING THEREFROM

William T. Glab, Dubuque, Iowa, assignor to Caradco Incorporated, a corporation of Iowa No Drawing. Filed Sept. 8, 1958, Ser. No. 759,388

8 Claims. (Cl. 106—163)

This invention relates to methods of making lignocellulose product and to the products resulting therefrom.

This application is a continuation-in-part of my copending application, Serial No. 443,711, filed July 15, 1954, now U.S. Patent No. 2,864,715.

It is an object of this invention to provide an improved method of making a moldable composition comprising reacting an essentially dry mixture including comminuted lignocellulose and a reactant including dibasic ammonium phosphate to split at least a portion of the lignin from the lignocellulose while confining the mixture of lignocellulose and reactant under superatmospheric pressure.

Another object of this invention is to provide such a method wherein the reaction is conducted in an atmosphere of steam at about 300–550° F. for about 4–60 minutes.

A further object of the invention is to provide lignocellulose products prepared by the above methods.

Other objects and advantages of the invention will be apparent from the following description of several embodiments of the invention.

An important advantage of the invention appears to be the controlling of the reaction so that the alpha cellulose is reduced in molecular size sufficiently to prevent swelling of subsequently fabricated products but not to the extent that toughness of fibre is lost. This latter occurs under drastic degradation and starts to become quite serious when approximately 25% of the lignocellulose has been lost as either gaseous or soluble by-products.

Another advantage appears to be the plasticization of the lignin component during the controlled cellulose degradation so that the lignin can subsequently be made to flow and function as a binder between the comminuted lignocellulose particles.

Another advantage is the provision of a relatively dry system so that high capacity for the processing of, for example, wood waste is attained. This is not possible in a wet process such as ordinarily found in a pulping process in which the reactor is charged with approximately 90% water which takes up space as well as requires the addition of large amounts of energy to bring the reaction medium to the proper temperature.

Another advantage is the contacting of lignocellulose or dry mixes of lignocellulose and other ingredients under superatmospheric pressure with a vapor or combination of vapors functioning both as a heat transfer medium and as a reactant.

In the method of this invention an essentially dry mixture including comminuted lignocellulose and a reactant including dibasic ammonium phosphate is reacted as by heating while confining the lignocellulose and the reactant under superatmospheric pressure as in an autoclave. During the reaction the lignocellulose bond is apparently broken and the lignin is released to operate as a binder.

It appears that the hemi-celluloses are the primary constituents of the lignocellulose which are attacked by hydrolysis, but that under the high pressure and temperature of this invention a portion of the hydrolysates are further converted to higher molecular weight materials which can function as plasticizers for the autoclave product when it is molded. At the same time a controlled degradation of the alpha cellulose is carried out to the extent that the desired degree of moisture stability is obtained in the molded or extruded products without an unnecessary loss of toughness. These actions are believed to occur although they have not been absolutely proven.

The methods of this invention may be carried out batchwise in an autoclave or a sealed press or continuously in a continuous contactor.

The lignocellulose which appears dry to the touch actually contains up to about 30% water before the reaction begins.

The lignocellulose which may be used in this invention includes wood as well as other lignocellulosic vegetable materials. The lignocellulose is finely divided so that the particles are preferably not more than 20 mesh in size as measured by a standard screen although smaller sizes are preferred.

During the reaction which takes place in a confined atmosphere under superatmospheric pressure various reaction products are produced although the exact nature of the reactions is not understood. It appears that the reaction products are either inert so that the product itself is inert, have a binding action such as is true of the lignin produced, are gaseous by-products, or are polymerized. By hydrolyzing and partially removing, or polymerizing the hemi-celluloses to lignin type materials, the ratio of lignin and other binders to the alpha-cellulose is increased so that the general nature of the lignocellulose mixture is drastically changed.

The high pressure method of this invention has a number of advantages that are not possible with reactions taking place at ordinary pressures and in an unconfined state. In the preferred process, steam is introduced into the autoclave both for heating purposes and to supply moisture for the reaction. In the high pressure method of this invention heat transfer is much more rapid so that in general a shorter reaction time is required. Furthermore, energy losses during the reaction are greatly reduced. In the ordinary reacting mixture these energy losses result from the release of volatile materials such as water vapor, gaseous reaction by-products and the like. As the reaction here takes place in a confined atmosphere, no such losses occur to any material degree. Furthermore, the energy supplied by the steam or vapor is utilized to heat only the lignocellulose with its approximately normal moisture content in contrast to pulping type reactions where large quantities of water are present, requiring far greater expenditures of energy.

Another important advantage of this process is the close control that is obtained over the reaction. Thus the temperature of the reacting mass, and hence the rate of reaction, can be easily raised or lowered by controlling the rate of flow, pressure and the temperature of the heat transfer medium which may be steam, oil vapor, or other high temperature fluids. Reactions may easily be stopped by flashing the heat transfer medium from the autoclave since the large energy loss on expansion cools the reacting mass below the incipient reaction point. During the practice of the process the reaction mixture may be confined in a jacketed vessel with the heating medium introduced to the chambers in the quantity and temperature desired.

A very important advantage of the invention is that volatile reactants may be used as the reacting mass is that volatile reactants may be used as the reacting mass is in a confined space. Volatile reactants are impossible, of course, when the reacting mass is in the open. As a result of the rapid heat transfer achieved by this invention and the penetration of volatile reactants the reaction not only proceeds to completion in a much shorter time but the final product tends to be more uniform than where the reactants are heated such as in an ordinary process that depends upon surface temperature differentials.

Tests have shown that the confining of the reacting mass in the autoclave not only causes retention of the by-products of reaction within the mass even when the by-products are gaseous but also causes polymerization of all or a portion of these by-products, even some that are gaseous. In so-called wet processes large quantities of the by-products of reaction go into solution and are lost.

Another advantage of the invention is that the volatile by-products are easily collected and removed at low cost for later use where desired or to prevent the creation of a nuisance.

Where volatile reactants are used in conjunction with the ammonium phosphate no mechanical mixing of the ingredients is required. This results in a considerable saving in time, labor and other factors. Thus, in these instances, it is only necessary to charge the reactor with the lignocellulose and introduce the volatile materials into the reactor under superatmospheric pressure. In addition, if desired, the reactants can be changed or modified during the course of a run. This is not possible to such a degree in a wet process where the charge generally contains less than 50% of lignocellulose, and addition of reactants would in many cases cause prohibitive amounts to go into solution.

A further advantage of utilizing a vapor process is that the volatile content of the reaction product which is primarily moisture can be controlled. By using superheated steam with a sufficient degree of superheat, products on the order of 1% or lower volatile content can be obtained. Under normal conditions, 10 to 15 degrees of superheat at 300 pounds per square inch steam pressure will produce a product of 3–5% volatile content. Thus the expensive drying step connected with wet processes can be avoided.

Because of rapid penetration of reactants under high pressure, larger sized particles can be charged to the autoclave than would ordinarily be used, and a savings in size reduction cost made as a result of lower power requirements to reduce the treated material in comparison with raw lignocellulose.

In addition, where flat stock or preformed material is being made as in a sealed press, the products can be made much thicker and more uniform than in an ordinary press which depends upon high platen temperatures for heat transfer, and in many cases requires almost prohibitive cycle times.

The preferred reactants include dibasic ammonium phosphate, dibasic ammonium phosphate plus lignin, and dibasic phosphate plus Vinsol. Vinsol is defined in my copending application Serial No. 608,196, filed September 6, 1956, now Patent 2,872,330.

The products of the reactions of this invention may be finished shaped materials or moldable compositions that may be used to make molded products. Where the product is molded after the reaction, this product is preferably removed from the reaction vessel and then ground to a fine powder that is preferably not over 50 mesh in size. The finely divided moldable material is heated to a temperature just sufficient to cause the material to flow and fill the mold under the pressure used. This temperature is kept sufficiently low, however, that losses are minor and breakdown due to decomposition is kept to a minimum. The preferred temperature is between 250–400° F.

The molding pressure may be any pressure sufficient to cause the material to fill completely the mold and will vary depending upon the shape of the mold, the nature of the moldable material and other factors. In the preferred process to produce high density materials this pressure is between 2,000–10,000 pounds per square inch. The molding time is only sufficient to cause the moldable material to fill the mold and set, and again will vary depending upon the type of mold being used, the temperature, the nature of the moldable material and similar factors. In general, the molding time will vary between 0.2–15 minutes.

The flow of the moldable material of this invention is improved and a shorter time is required if a plasticizer is added.

Plasticizers in general which have been found to be effective with the moldable materials include water; aromatic compounds containing a hydroxyl group such as aniline, phenol and cresol, alcohols such as benzyl, diethyleneglycol, glycerol, and furfuryl; nitrogen compounds such as formamide, urea, pyridine, and triethanolamine; and furfural.

The preferred plasticizers are water, furfural, aniline and phenol and the quantity utilized may vary depending on the flow desired. The preferred quantity is between about 2–20%.

In particular, the choice of plasticizer will depend upon the end use or method of fabrication of the material. The reaction products themselves are of a slow thermosetting nature. Thus, if a plasticizer such as water which is incapable of thermoset is used, the material is essentially of a thermoplastic nature. This is also true of the preferred plasticizers as a group; however, when desired, thermoset compositions can be made by using furfural, aniline or phenol in conjunction with a catalyst and, if desired, other materials capable of copolymerization.

Materials which will function as catalysts include the oxides, hydroxides and carbonates of the alkali and alkaline earth metals. The preferred catalysts are the oxides of magnesium and zinc.

Among the materials which may be used with the thermosetting plasticizers as copolymers are hexamethylene tetramine, dimethylolurea, paraformaldehyde and urea.

Depending upon the set time required, about 0.5–5.0% of the catalyst and about 0.5–10% of the copolymer are used.

If desired, thermoset products can be obtained without the use of catalysts or copolymers merely by heat treating the fabricated products after they have been molded or extruded.

If desired, products of density ranging from 0.2–1.3 specific gravity may be produced in the high pressure reacting vessel itself without requiring a subsequent molding operation as described above with high pressure molding. Here the finely divided lignocellulose and the reactant are mixed where the reactant is a solid or liquid and the mixture cold pressed into the desired shape or compacted in a sealed press. The compressed mixture is then heated in the press or other high pressure vessel for the required time at the required temperature and pressure. The material when removed from the reaction vessel will then be found to be quite hard and strong. In these instances, the reactant may be any of those set out above.

The preferred amount of ammonium phosphate varies between about 1–10% by weight of the lignocellulose. When lignin is also used, the amount of lignin is between about 2–20% by weight of the lignocellulose. Where Vinsol is used in conjunction with dibasic ammonium phosphate the preferred amount of Vinsol is between about 2–20% by weight of the lignocellulose.

Steam may or may not be supplied to the reaction vessel depending upon the result desired. If steam is used, it is preferably supplied at 100–1000 pounds per square inch pressure and at a temperature of 400–550° F. In the event that a sealed press is used, the normal moisture content of the wood as well as the reaction by-products may be used to build up to a predetermined pressure which can be maintained constant by venting the excess vapors produced. This pressure is preferably between 100–600 pounds per square inch. Such a procedure eliminates the blow-ups encountered in treating wood in an ordinary hot press at high temperatures, as well as drastically reducing press time, and polymerizes a percentage of the gaseous and low molecular weight by-products to resinous-like materials which function as binders for lignocellulose particles. If desired, a two step process may be used in which the first step includes the pressure treatment and the second step includes venting the vapors to atmospheric pressure followed by a 2–10 minute heat treatment period before removing the material from the press or the autoclave.

EXAMPLE 1

Finely divided lignocellulose was thoroughly mixed with 3% by weight of dibasic ammonium phosphate and 6% of finely divided by-product lignin. The mixture was placed in a steel cylinder that had a continuous baffled port on the inner wall to which was connected a pressure line fitted with a pressure gauge and a valve. Gaskets were placed on both ends of the cylinder, and steel stops were placed on the top and bottom of the material so that it would be compressed below the depth of the cylinder when the device was placed in a hot press.

A number of experiments were conducted according to the method of this example. In one experiment the press was heated to 450° F., the press closed on the gaskets and the material was allowed to develop its own pressure as a result of the reaction. No external steam was introduced into the ring. The pressure was permitted to rise to 400 pounds per square inch where it was held substantially constant by venting the excess pressure. The cylinder took approximately 15 minutes to reach this pressure, and the material was held confined in the press for a total of 25 minutes. When the product was removed, it was found to be very dark, tough and uniform. It had a density of 50 pounds per cubic foot and a modulus of rupture of 2,425 pounds per square inch, which was quite high for a lignocellulose reaction product of that density.

To show the effect of even a small amount of pressure, two 20 minute runs were made as above, except that in the first run the cylinder was continuously vented so that no pressure was allowed to develop; while in the second the pressure rose to 100 pounds per square inch where it was maintained constant. The products obtained and their moduli of rupture were:

| Pressure | Density of Product, lb. per cu. ft. | Modulus of Rupture, lb. per sq. in. |
| --- | --- | --- |
| 0 | 51.9 | 1,304 |
| 100 | 49.3 | 1,617 |
| 400 | 50.0 | 2,425 |

Thus, the beneficial effect of increased pressure is readily apparent, and the runs prove that an ordinary hot press fitted with gaskets can be used as an autoclave for the single stage production of materials. The introduction of steam at the start of the press cycle rather than depending on the material for development of pressure drastically reduces cycle time. In addition, control of the press process is greatly increased by control of vapor pressure which is impossible in an open press.

In the methods of this invention the high pressure reaction may be used to treat the lignocellulose prior to molding but may also be used to chemically treat the lignocellulose without molding as the treated material itself has other uses such as employment as fillers in various plastic compositions. The method may also be used to produce products of a wide range of densities wherein the high pressure reaction and shaping is carried on at the same time.

Where the reaction takes place in an atmosphere of steam the volatile content of the resulting product may be reduced by using superheated steam. There is, of course, very little condensation with superheated steam. The following table shows the reduction obtained in the volatile content of the product by operating with superheated steam:

Autoclave

| Run No. | Time— Mins. | Temp., ° F. | Pressure, p.s.i. | Percent Volatile Content |
| --- | --- | --- | --- | --- |
| A | 10 | 419 | 323 | 14.5 |
| B | 10 | 425 | 300 | 5.89 |
| C | 20 | 438 | 256 | 1.3 |
| D | 30 | 417 | 330 | 58.3 |
| E | 30 | 425 | 300 | 5.78 |

All of the above runs were made with plain lignocellulose, but are typical of the results in general.

It was also found that when the reaction pressure is increased, the reaction time was considerably decreased. Thus, where ground lignocellulose was used with steam at 300 pounds per square inch and about 425–450° F. temperature as a reactant the reaction time was found to be 20 minutes at this 300 pounds per square inch pressure. When the pressure was increased to 400 pounds per square inch, the reaction time was only about 7 minutes. Where the steam pressure was increased to 500 pounds per square inch, the reaction time was reduced to between 4–5 minutes. These steam pressures were all gauge pressures.

EXAMPLE 2

To 500 grams of 20 mesh, hammermilled ponderosa pine, containing only its normal moisture content of approximately 6% was added 100 grams of a 10% solution of dibasic ammonium phosphate in water. Based on the weight of the lignocellulose the amount of solution was approximately 20% and the dibasic ammonium phosphate was approximately 2%. The mixture was ball-milled for approximately ½ hour to obtain a uniform dispersion of the dibasic ammonium phosphate throughout the mass. This composition was then placed in a heated autoclave, and steam was admitted until the pressure was 300 pounds per square inch gauge, and the temperature was approximately 425° F. The autoclave was held under these conditions for 15 minutes, and then the steam was rapidly flashed off. During the course of the run, the pressure was maintained at 300 p.s.i. by venting off the excess pressure caused by volatile reaction by-products. The granular reaction product, which had been cooled below the incipient reaction point by the rapid steam flash-off, was removed from the autoclave, and all particles which had consolidated were thoroughly broken up. The moisture or volatile content of this material was approximately 10%.

In the same manner as specified for Example 2, reaction products of lignocellulose and Vinsol, and lignocellulose and lignin in the presence of dibasic ammonium phosphate were prepared. With both Vinsol and lignin an amount equal to 5% based on the weight of the lignocellulose was added prior to the addition of the dibasic ammonium phosphate solution. The dry mix was thoroughly blended in a ball-mill before the solution was added.

To determine the effect of dibasic ammonium phosphate, as well as Vinsol and lignin, controls were run in which only 20 mesh ponderosa pine was autoclaved in the same manner as Example 2. The following table sets forth the autoclave conditions and reaction times for the controls, as well as for the runs containing Vinsol and lignin.

| Example No. | Run No. | Percent Dibasic Ammonium Phosphate | Additive | Reaction Time, Min. | Autoclave Temperature, ° F. | Autoclave Pressure, p.s.i. |
| --- | --- | --- | --- | --- | --- | --- |
| Control A | (472) | None | None | 20 | 440 | 300 |
| Control B | (146) | do | do | 30 | 440 | 300 |
| 3 | (494) | 2 | 5% Vinsol | 20 | 440 | 300 |
| 4 | (497) | 2 | 5% Lignin | 20 | 440 | 300 |

The reaction products from Examples 2, 3 and 4 as well as controls A and B were then evaluated by pressing them into boards, and testing the boards to determine their moisture resistance and strength. The boards were formed by placing 80 grams of the reaction products into a 4 x 5 x ¾-inch high steel frame, and leveling the material. A 4 x 5-inch steel plug heated to the press temperature was then placed on top of the material, and this assembly was put into a hot press. The following table sets forth the press temperature, pressure and time cycle that was used for the various reaction products, along with the results of the physical property tests which were made with the boards. The dimensional stability in the presence of moisture was determined in both a 1-hour boil and a 48-hour immersion test. In addition, the boards were tested in flexure to obtain their modulus of rupture.

| Material Example | Board No. | Percent Phosphate | Time, Min. | Temp., °F. | Press, p.s.i. | Density, lbs./ft.³ | M.R. p.s.i. | Increase from Boil Test | | Increase from 48-hour Immersion | |
|---|---|---|---|---|---|---|---|---|---|---|---|
| | | | | | | | | Wt., percent | Thick., percent | Wt., percent | Thick., percent |
| Control A | (543) | None | 10 | 400 | 40 | 42.5 | 393 | 74.8 | 16.5 | 75.5 | 5.2 |
| Control B | (550) | do | 10 | 400 | 40 | 39.0 | 247 | 92.3 | 19.7 | 84.8 | 4.9 |
| 2 | (605) | 2 | 10 | 400 | 40 | 40.2 | 420 | 72.3 | 8.7 | 80.2 | 3.1 |
| 3 | (608) | 2 | 10 | 400 | 40 | 50.0 | 745 | 41.8 | 6.1 | 46.8 | 3.1 |
| 4 | (607) | 2 | 10 | 400 | 40 | 46.6 | 593 | 57.0 | 9.5 | 58.9 | 4.1 |

From the foregoing table it is apparent that the dimensional stability exhibits a decided improvement when dibasic ammonium phosphate is reacted with the lignocellulose. Where Vinsol or lignin are included the compressibility is improved so that a stronger bond results.

The reaction temperatures and times are controlled as desired to produce flow of moldability in the autoclave product and strength and stability in the final product. Thus, where the product is to be used as a molding material, it was discovered that under the above conditions with plain lignocellulose a reaction time of less than 20 minutes resulted in poor flow. But at this same stream pressure and using the same lignocellulose a reaction time of over 30 minutes produced a high quality moldable product. Apparently steam breaks down the lignocellulose so that the lignin acts as a binder while some of the hydrolized products of the reaction operate as plasticizers. In the high pressure confined atmosphere method of this invention, these reaction products are primarily retained. In the prior processes where a hydrolizing reaction was carried out either in the atmosphere or in a slurry, many of the by-products either passed off as gases or were dissolved and removed in the liquid. Thus by avoiding excess water the process of this invention results in the saving of substantial portions of the hemi-celluloses and makes them available for use as plasticizers. However, if the reaction is carried on too long a time at too high a temperature, the hemi-celluloses and other hydrolized products of the reaction tend to polymerize so that the final product exhibits lack of flow and is difficult to mold. The nature of these polymerizates is not completely understood.

Thus one of the advantages of the process of this invention is that it reduces losses of the lignocellulose and, furthermore, permits the use of lower molding pressures and temperatures when the reaction product is used as a molding composition.

Having described my invention as related to the embodiments set out herein, it is my intention that the invention be not limited by any of the details of description unless otherwise specified, but rather be construed broadly within its spirit and scope as set out in the accompanying claims.

I claim:
1. The method of making a lignocellulose product, consisting essentially of: intimately mixing particles of essentially dry lignocellulose with between about 1–10% of ammonium phosphate by weight of the lignocellulose; and heating the resulting composition under a pressure of between about 100–1000 pounds per square inch in a confined atmosphere in the presence of steam at a temperature of about 300–550° F. for about 4–60 minutes to combine chemically said phosphate with the lignocellulose.

2. The method of making a lignocellulose product, consisting essentially of: intimately mixing particles of essentially dry lignocellulose with between about 1–10% of dibasic ammonium phosphate by weight of the lignocellulose; and heating the resulting composition under a pressure of between about 100–1000 pounds per square inch in a confined atmosphere in the presence of steam at a temperature of about 300–550° F. for about 4–60 minutes to combine chemically said phosphate with the lignocellulose.

3. The method of making a lignocellulose product, consisting essentially of: intimately mixing particles of essentially dry lignocellulose with about 1–10% ammonium phosphate and about 2–20% lignin, both being by weight of the lignocellulose; and heating the resulting composition under a pressure of between about 100–1000 pounds per square inch in the presence of steam for between about 4–60 minutes and at between about 300–550° F. to combine chemically said phosphate and the lignin with the lignocellulose.

4. A lignocellulose product prepared by the method of claim 1.

5. A lignocellulose product prepared by the method of claim 3.

6. The method of making a lignocellulose product, consisting essentially of: intimately mixing particles of essentially dry lignocellulose with between about 1–10% of ammonium phosphate and between about 2–20% of a finely divided solvent extracted solid pine wood resin substantially free of wood rosin, said amounts being by weight of the lignocellulose; and heating the resulting composition under a pressure of between about 100–1000 pounds per square inch in a confined atmosphere in the presence of steam at a temperature of about 300–550° F. for about 4–60 minutes to combine chemically said phosphate with the lignocellulose.

7. The method of making a lignocellulose product, consisting essentially of: intimately mixing particles of essentially dry lignocellulose with about 1–10% of dibasic ammonium phosphate, and between about 2–20% of a finely divided solvent extracted solid pine wood resin substantially free of wood rosin, said amounts being by weight of the lignocellulose; and heating the resulting composition under a pressure of between about 100–1000 pounds per square inch in a confined atmosphere in the presence of steam at a temperature of about 300–550° F. for about 4–60 minutes to combine chemically said phosphate with the lignocellulose.

8. The method of making a lignocellulose product, consisting essentially of: intimately mixing particles of essentially dry lignocellulose with about 1–10% of ammonium phosphate, about 2–20% lignin, and between about 2–20% of a finely divided solvent extracted solid pine wood resin substantially free of wood rosin, said amounts being by weight of the lignocellulose; and heating the resulting composition under a pressure of between about 100–1000 pounds per square inch in a confined atmosphere in the presence of steam at a temperature of about 300–550° F. for about 4–60 minutes to combine chemically said phosphate with the lignocellulose.

References Cited in the file of this patent

UNITED STATES PATENTS

| | | |
|---|---|---|
| 2,692,206 | Othmer et al. | Oct. 19, 1954 |
| 2,779,683 | Gill | Jan. 29, 1957 |
| 2,872,330 | Glab | Feb. 3, 1959 |

FOREIGN PATENTS

| | | |
|---|---|---|
| 528,355 | Canada | July 31, 1956 |
| 497,477 | Great Britain | Dec. 16, 1938 |